US012597110B2

(12) United States Patent
Wang et al.

(10) Patent No.: US 12,597,110 B2
(45) Date of Patent: Apr. 7, 2026

(54) IMAGE RECOGNITION METHOD, APPARATUS AND DEVICE

(71) Applicant: Momenta (Suzhou) Technology Co., Ltd., Suzhou (CN)

(72) Inventors: Jinwei Wang, Suzhou (CN); Yuan Li, Suzhou (CN)

(73) Assignee: Momenta (Suzhou) Technology Co., Ltd., Suzhou City (CN)

( * ) Notice: Subject to any disclaimer, the term of this patent is extended or adjusted under 35 U.S.C. 154(b) by 250 days.

(21) Appl. No.: 18/482,149

(22) Filed: Oct. 6, 2023

(65) Prior Publication Data

US 2024/0029226 A1     Jan. 25, 2024

Related U.S. Application Data

(63) Continuation of application No. PCT/CN2022/083509, filed on Mar. 28, 2022.

(30) Foreign Application Priority Data

Dec. 28, 2021     (CN) .......................... 202111625658.8

(51) Int. Cl.
*G06T 7/00* (2017.01)
*G06T 5/20* (2006.01)

(52) U.S. Cl.
CPC .............. *G06T 7/0002* (2013.01); *G06T 5/20* (2013.01); *G06T 2207/20081* (2013.01); *G06T 2207/30168* (2013.01)

(58) Field of Classification Search
CPC ..................... G06T 7/0002; G06T 5/20; G06T 2207/20081; G06T 2207/30168
(Continued)

(56) References Cited

FOREIGN PATENT DOCUMENTS

| CN | 110717458 A | 1/2020 |
| CN | 112270218 A | 1/2021 |

(Continued)

OTHER PUBLICATIONS

Abed, Rahma, Sahbi Bahroun, and Ezzeddine Zagrouba. "KeyFrame extraction based on face quality measurement and convolutional neural network for efficient face recognition in videos." Multimedia Tools and Applications 80.15 (2021): 23157-23179. (Year: 2021).*

(Continued)

*Primary Examiner* — Jonathan S Lee

(74) *Attorney, Agent, or Firm* — JCIPRNET

(57)     ABSTRACT

The present disclosure provides an image recognition method, apparatus and device. In the method, after a plurality of to-be-recognized images of a preset target are obtained, first image recognition is performed on the plurality of to-be-recognized images to obtain a plurality of recognition result vectors, and further, the plurality of recognition result vectors are input a preset image quality determination model, where the preset image quality determination model is configured to, based on vector distances between the plurality of recognition result vectors corresponding to the plurality of to-be-recognized images, determine a quality of the plurality of to-be-recognized images. Thus, based on the quality, second image recognition is performed. In this way, the quality of the to-be-recognized images is considered during image recognition, which solves the problems of missing detections and low recognition result accuracy in the existing image recognition.

19 Claims, 4 Drawing Sheets

S201 A plurality of to-be-recognized images of a preset target are obtained.

S202 Based on the plurality of to-be-recognized images, first image recognition is performed to obtain a plurality of recognition result vectors corresponding to the plurality of to-be-recognized images.

S203 The plurality of recognition result vectors are input into a preset image quality determination model, where the image quality determination model is configured to determine a quality of the plurality of to-be-recognized images based on vector distances between a plurality of recognition result vectors corresponding to the plurality of to-be-recognized images.

S204 Based on the quality of the plurality of to-be-recognized images, second image recognition is performed.

(58) Field of Classification Search
USPC .......................................................... 382/254
See application file for complete search history.

(56) References Cited

FOREIGN PATENT DOCUMENTS

| CN | 112669509 A | 4/2021 |
| CN | 112990268 A | 6/2021 |
| CN | 113392866 | 9/2021 |
| WO | 2019062743 | 4/2019 |

OTHER PUBLICATIONS

Zaeemzadeh, Alireza, et al. "Face image retrieval with attribute manipulation." Proceedings of the IEEE/CVF international conference on computer vision. 2021. (Year: 2021).*
China Patent Office, International Search Report, Application No. PCT/CN2022/083509, mailed Aug. 29, 2022, 9 pages.

Shi; Liang-Wu et al., "Method of pose-varied face recognition based on clustering algorithm and hierarchical support vector machines", Computer Engineering and Design, Jun. 2007, with English abstract, pp. 2922-2924, vol. 28, No. 12.
Rahma Abed et al., "Face Retrieval in Videos using Face Quality Assessment and Convolution Neural Networks", 2020 IEEE 16th International Conference on Intelligent Computer Communication and Processing (ICCP), Sep. 3, 2020, pp. 399-405.
Sahbi Bahroun et al., "KS-FQA: Keyframe selection based on face quality assessment for efficient face recognition in video", IET Image Processing, Dec. 6, 2020, pp. 77-90, vol. 15.
Torsten Schlett et al., "Face Image Quality Assessment: A Literature Survey", ACM Computing Surveys, Sep. 2022, pp. 210:1 to 210:49, vol. 54, No. 10s, Article 210.
"First Office Action of China Counterpart Application", issued on Oct. 16, 2025, with English translation thereof, p. 1-p. 14.
"Search Report of Europe Counterpart Application", issued on Oct. 28, 2025, p. 1-p. 6.

* cited by examiner

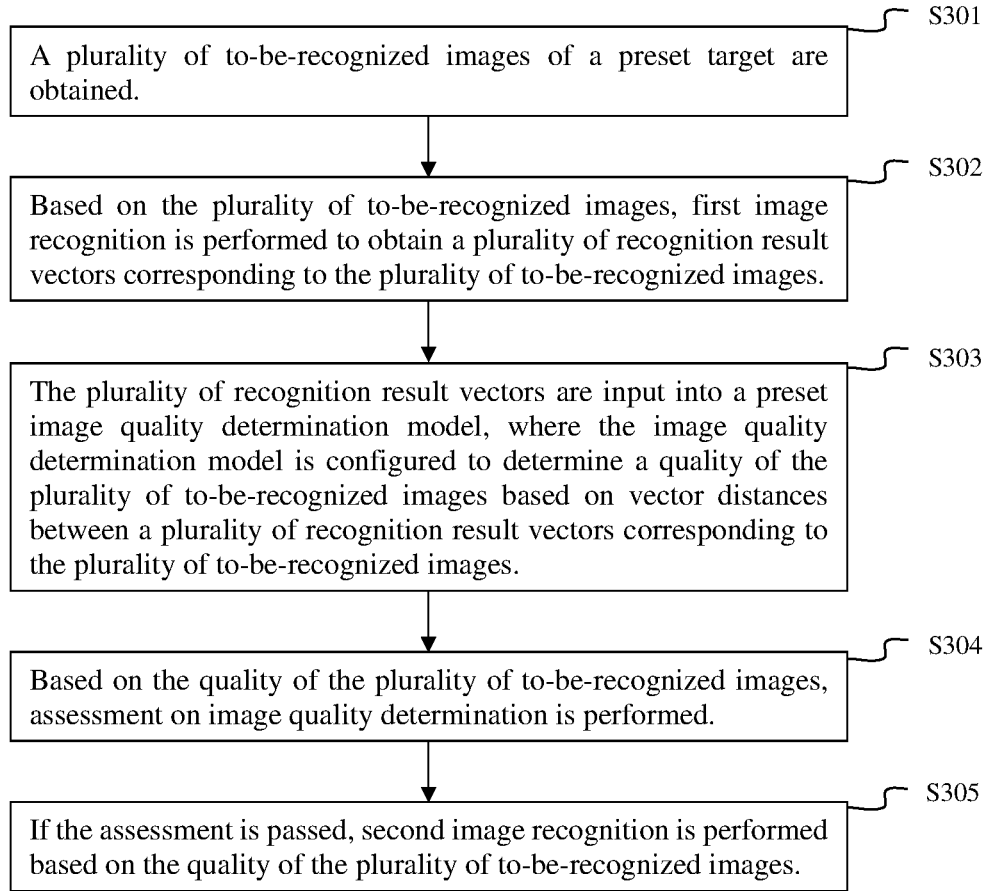

S301

A plurality of to-be-recognized images of a preset target are obtained.

S302

Based on the plurality of to-be-recognized images, first image recognition is performed to obtain a plurality of recognition result vectors corresponding to the plurality of to-be-recognized images.

S303

The plurality of recognition result vectors are input into a preset image quality determination model, where the image quality determination model is configured to determine a quality of the plurality of to-be-recognized images based on vector distances between a plurality of recognition result vectors corresponding to the plurality of to-be-recognized images.

S304

Based on the quality of the plurality of to-be-recognized images, assessment on image quality determination is performed.

S305

If the assessment is passed, second image recognition is performed based on the quality of the plurality of to-be-recognized images.

FIG. 3

Image recognition apparatus 50

IMAGE RECOGNITION METHOD, APPARATUS AND DEVICE

CROSS REFERENCE TO RELATED APPLICATIONS

This application is a continuation of International Application No. PCT/CN2022/083509, filed on Mar. 28, 2022, which claims priority to Chinese Patent Application No. 202111625658.8, filed on Dec. 28, 2021. The disclosures of the aforementioned applications are hereby incorporated by reference in their entireties.

TECHNICAL FIELD

The present disclosure relates the field of image processing technologies, and in particular to an image recognition method, apparatus and device.

BACKGROUND

Based on image recognition technology, relevant information of an object included in an image can be recognized. For example, by performing recognition on a face image of a person, some information of the person can be determined. Therefore, along with continuous development of the economy, the image recognition technology is applied more and more widely, for example, the face recognition has already been applied to the fields such as security protection, on-vehicles and finances.

In the on-vehicle field, many vehicles are provided with a face recognition function to provide custom services to the vehicle owners. For example, by face recognition, an act of a driver can be determined, and thus, when the act of the driver is determined to be an act unfavorable for safe travel of the vehicle, measures can be taken in time to minimize influence of the act of the driver on the safe travel of the vehicle.

However, in a case of image recognition, for example, face recognition, when a camera captures data, an obtained face images may have the problems of over-bright, over-dark, blurred regions, blocking or excessively large head pose and the like. In this case, the face images have poor quality (these images with poor quality can be collectively referred to as low-quality images). When face recognition is performed on the low-quality images subsequently, there may be many missing detections (False Negative, FN), leading to a lower recognition result accuracy. Therefore, relevant persons cannot perform correct processing based on the recognition results. For example, in the on-vehicle fields, the accuracy of recognizing the acts of the driver unfavorable for safe travel of the vehicle by using face recognition is reduced, greatly increasing the possibility of occurrence of vehicle accidents.

SUMMARY

In order to address the problems in the prior arts, the present disclosure provides an image recognition method, apparatus and device.

According to a first aspect of embodiments of the present disclosure, there is provided an image recognition method, including:

obtaining a plurality of to-be-recognized images of a preset target;

based on the plurality of to-be-recognized images, performing first image recognition to obtain a plurality of recognition result vectors corresponding to the plurality of to-be-recognized images;

inputting the plurality of recognition result vectors into a preset image quality determination model, where the image quality determination model is configured to determine a quality of the plurality of to-be-recognized images based on vector distances between the plurality of recognition result vectors corresponding to the plurality of to-be-recognized images;

based on the quality of the plurality of to-be-recognized images, performing second image recognition.

In one possible implementation, before inputting the plurality of recognition result vectors into the preset image quality determination model, the method further includes:

obtaining a plurality of reference images, and performing first image recognition on the plurality of reference images to obtain a plurality of recognition result vectors corresponding to the plurality of reference images;

determining a vector distance between a recognition result vector $F_i$ and each of the remaining recognition result vectors other than the recognition result vector $F_i$ in the plurality of recognition result vectors corresponding to the plurality of reference images, where the recognition result vector $F_i$ is any recognition result vector in the plurality of recognition result vectors corresponding to the plurality of reference images, $i=1, \ldots, N$, and N is a number of vectors in the plurality of recognition result vectors corresponding to the plurality of reference images;

based on the vector distances, training an initial image quality determination model such that a value of a loss function of the trained initial image quality determination model satisfies a preset requirement, where the value of the loss function is determined based on a predicted quality of the plurality of reference images and a true quality of the plurality of reference images, and the predicted quality of the plurality of reference images is determined based on the vector distances;

based on the trained initial image quality determination model, obtaining the preset image quality determination model.

In one possible implementation, before, based on the vector distances, training the initial image quality determination model, the method further includes:

obtaining a minimum distances from the vector distances;

determining whether the minimum distance is greater than a preset distance threshold;

based on the vector distances, training the initial image quality determination model includes:

in response to that the minimum distance is less than or equal to the preset distance threshold, training the initial image quality determination model based on the vector distances.

In one possible implementation, training the initial image quality determination model based on the vector distances includes:

obtaining a minimum distance from the vector distances, and calculating a first difference between a mean value of the distances of pre-stored negative samples and a vector distance corresponding to the recognition result vector $F_i$, and a second difference between the mean value of the distances and the minimum distance;

based on the first difference and the second difference, training the initial image quality determination model, where the predicted quality of the plurality of reference images is determined based on the first difference and the second difference.

In one possible implementation, before performing second image recognition based on the quality of the plurality of to-be-recognized images, the method further includes:

based on the quality of the plurality of to-be-recognized images, performing assessment on image quality determination;

based on the quality of the plurality of to-be-recognized images, performing second image recognition includes:

if the assessment is passed, performing second image recognition based on the quality of the plurality of to-be-recognized images.

In one possible implementation, based on the quality of the plurality of to-be-recognized images, performing assessment on image quality determination includes:

based on the quality of the plurality of to-be-recognized images, determining to-be-filtered images in the plurality of to-be-recognized images;

based on positive sample images in the plurality of to-be-recognized images, determining a before-filtering positive sample ratio, and based on the to-be-filtered images, determining a filtering ratio;

based on the before-filtering positive sample ratio, determining a change curve of an after-filtering positive sample ratio and the filtering ratio;

based on the change curve of the after-filtering positive sample ratio and the filtering ratio, performing assessment on image quality determination.

In one possible implementation, based on the change curve of the after-filtering positive sample ratio and the filtering ratio, performing assessment on image quality determination includes:

obtaining a pre-stored change curve of the after-filtering positive sample ratio and the filtering ratio;

based on the change curve of the after-filtering positive sample ratio and the filtering ratio and the pre-stored change curve of the after-filtering positive sample ratio and the filtering ratio, determining an assessment index value;

if the assessment index value is greater than a preset assessment threshold, determining the assessment is passed.

In one possible implementation, based on the quality of the plurality of to-be-recognized images, performing second image recognition includes:

based on the quality of the plurality of to-be-recognized images and a preset quality requirement, obtaining target images from the plurality of to-be-recognized images;

based on the target images, performing second image recognition.

In one possible implementation, based on the plurality of to-be-recognized images, performing first image recognition to obtain a plurality of recognition result vectors corresponding to the plurality of to-be-recognized images includes:

inputting the plurality of to-be-recognized images into a preset image recognition model, wherein the preset image recognition model, based on the input images, outputs recognition result vectors;

based on the output of the preset image recognition model, obtaining a plurality of recognition result vectors corresponding to the plurality of to-be-recognized images.

According to a second aspect of embodiments of the present disclosure, there is provided an image recognition apparatus, including:

an image obtaining module, configured to obtain a plurality of to-be-recognized images of a preset target;

a first image recognizing module, configured to, based on the plurality of to-be-recognized images, perform first image recognition to obtain a plurality of recognition result vectors corresponding to the plurality of to-be-recognized images;

a quality determining module, configured to input the plurality of recognition result vectors into a preset image quality determination model, wherein the image quality determination model is configured to determine a quality of the plurality of to-be-recognized images based on vector distances between the plurality of recognition result vectors corresponding to the plurality of to-be-recognized images;

a second image recognizing module, configured to, based on the quality of the plurality of to-be-recognized images, perform second image recognition.

In one possible implementation, the quality determining module is further configured to:

obtain a plurality of reference images, and perform first image recognition on the plurality of reference images to obtain a plurality of recognition result vectors corresponding to the plurality of reference images;

determine a vector distance between a recognition result vector $F_i$ and each of the remaining recognition result vectors other than the recognition result vector $F_i$ in the plurality of recognition result vectors corresponding to the plurality of reference images, wherein the recognition result vector $F_i$ is any recognition result vector in the plurality of recognition result vectors corresponding to the plurality of reference images, $i=1, \ldots, N$, and N is a number of vectors in the plurality of recognition result vectors corresponding to the plurality of reference images;

based on the vector distances, train an initial image quality determination model such that a value of a loss function of the trained initial image quality determination model satisfies a preset requirement, where the value of the loss function is determined based on a predicted quality of the plurality of reference images and a true quality of the plurality of reference images, and the predicted quality of the plurality of reference images is determined based on the vector distances;

based on the trained initial image quality determination model, obtain the preset image quality determination model.

In one possible implementation, the quality determining module is further configured to:

obtain a minimum distances from the vector distances;

determine whether the minimum distance is greater than a preset distance threshold;

in response to that the minimum distance is less than or equal to the preset distance threshold, train the initial image quality determination model based on the vector distances.

In one possible implementation, the quality determining module is specifically configured to:

obtain a minimum distance from the vector distances, and calculate a first difference between a mean value of the distances of pre-stored negative samples and a vector distance corresponding to the recognition result vector $F_i$, and a second difference between the mean value of the distances and the minimum distance;

based on the first difference and the second difference, train the initial image quality determination model, where the predicted quality of the plurality of reference images is determined based on the first difference and the second difference.

In one possible implementation, the second image recognizing module is further configured to:

based on the quality of the plurality of to-be-recognized images, perform assessment on image quality determination;

if the assessment is passed, perform second image recognition based on the quality of the plurality of to-be-recognized images.

In one possible implementation, the second image recognizing module is specifically configured to:

based on the quality of the plurality of to-be-recognized images, determine to-be-filtered images in the plurality of to-be-recognized images;

based on positive sample images in the plurality of to-be-recognized images, determine a before-filtering positive sample ratio, and based on the to-be-filtered images, determining a filtering ratio;

based on the before-filtering positive sample ratio, determine a change curve of an after-filtering positive sample ratio and the filtering ratio;

based on the change curve of the after-filtering positive sample ratio and the filtering ratio, perform assessment on image quality determination.

In one possible implementation, the second image recognizing module is specifically configured to:

obtain a pre-stored change curve of the after-filtering positive sample ratio and the filtering ratio;

based on the change curve of the after-filtering positive sample ratio and the filtering ratio and the pre-stored change curve of the after-filtering positive sample ratio and the filtering ratio, determine an assessment index value;

if the assessment index value is greater than a preset assessment threshold, determine the assessment is passed.

In one possible implementation, the second image recognizing module is specifically configured to:

based on the quality of the plurality of to-be-recognized images and a preset quality requirement, obtain target images from the plurality of to-be-recognized images;

based on the target images, perform second image recognition.

In one possible implementation, the first image recognizing module is specifically configured to:

input the plurality of to-be-recognized images into a preset image recognition model, where the preset image recognition model, based on the input images, outputs recognition result vectors;

based on the output of the preset image recognition model, obtain a plurality of recognition result vectors corresponding to the plurality of to-be-recognized images.

According to a third aspect of embodiments of the present disclosure, there is provided an image recognition device, including:

a processor;

a memory; and, a computer program;

where the computer program is stored in the memory and configured for being executed by the processor, and the computer program includes instructions for performing the method as described in the first aspect.

According to a fourth aspect of embodiments of the present disclosure, there is provided a computer readable storage medium, storing a computer program thereon, where the computer program enables a processor to perform the method as described in the first aspect.

According to a fifth aspect of embodiments of the present disclosure, there is provided a computer program product, including computer instructions, where the computer instructions are executed by a processor to perform the method as described in the first aspect.

In the image recognition method, apparatus and device provided by the embodiments of the present disclosure, after a plurality of to-be-recognized images of a preset target are obtained, first image recognition is performed on the plurality of to-be-recognized images to obtain a plurality of recognition result vectors, and further, the plurality of recognition result vectors are input a preset image quality determination model, where the preset image quality determination model is configured to, based on vector distances between the plurality of recognition result vectors corresponding to the plurality of to-be-recognized images, determine a quality of the plurality of to-be-recognized images. Thus, based on the quality, second image recognition is performed. In this way, the quality of the to-be-recognized images is considered during image recognition, which solves the problems of missing detections and low recognition result accuracy in the existing image recognition. Further, in the embodiments of the present disclosure, since the image recognition accuracy is improved, relevant persons can perform correct processing in time based on the recognition results. Hence, the actual application requirements can be satisfied.

BRIEF DESCRIPTION OF THE DRAWINGS

In order to more clearly describe the technical solution in the embodiments of the present disclosure or in the prior arts, the drawings required for descriptions of the embodiments or the prior arts will be briefly introduced below. Apparently, the drawings described below are merely some embodiments of the present disclosure. Those skilled in the art may obtain other drawings based on these drawings without making creative work.

FIG. 3 is a flowchart illustrating another image recognition method according to an embodiment of the present disclosure.

DETAILED DESCRIPTION OF THE EMBODIMENTS

Figure 1:
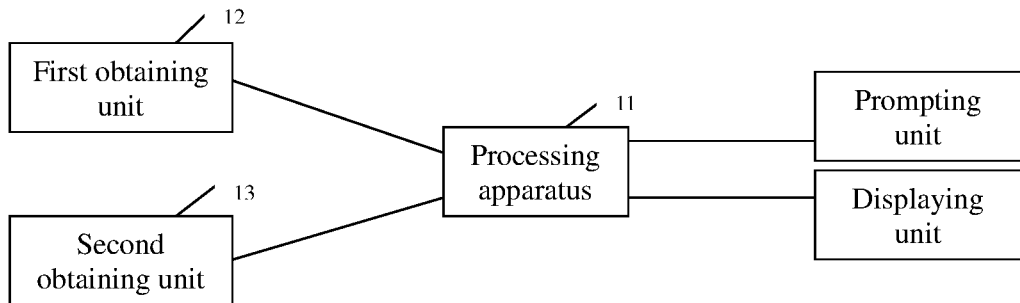
FIG. 1 is an architecture schematic diagram illustrating an image recognition system according to an embodiment of the present disclosure.

The technical solution of the embodiments of the present disclosure will be clearly and fully described in combination with the drawings in the embodiments of the present disclosure. Apparently, the embodiments described herein are merely some embodiments of the present disclosure rather than all embodiments. All other embodiments obtained by those skilled in the art based on these embodiments of the present disclosure without making creative work shall fall within the scope of protection of the present disclosure.

The terms such as "first" "second" "third" and "fourth" (if present) in the specification and claims of the present disclosure and the above drawings are used to distinguish similar objects rather than describe a specific sequence or precedence. It should be understood that the data used this way can be interchanged in proper cases, such that the embodiments of the present disclosure described herein can be implemented in a sequence other than the illustrated or described sequences. Furthermore, the terms "comprise" and "have" and their variations are intended to cover non-exclusive inclusion, for example, a process, a method, a system, a product or a device including a series of steps or units are not necessarily limited to those clearly-listed steps or units but may include unclearly listed steps or units or other steps or units inherent to the process, method, product or device.

In the present days of intelligence, image recognition has been applied to many fields. For example, face recognition has been applied to security protection, on-vehicles and finances and the like. In the on-vehicle field, many vehicles are provided with the face recognition function to provide custom services to the vehicle owners. When a camera captures data, some images are not suitable for face recognition because the images may have the problems of over-bright, over-dark, blurred regions, blocking or excessively large head pose and the like. In this case, the face images have poor quality (these images with poor quality can be collectively referred to as low-quality images).

By a large number of tests, it is found that subsequent face recognition involving low-quality images may lead to more FNs and lower recognition result accuracy. For example, in the vehicle driving field, the accuracy of recognizing an act of a driver unfavorable for safe travel of a vehicle by performing face recognition with low-quality images is reduced, greatly increasing the possibility of vehicle accidents.

In order to solve the above problems, an embodiment of the present disclosure provides an image recognition method in which a quality of to-be-recognized images is considered such that image recognition is performed based on the quality of the to-be-recognized images. In this way, the problems of the FNs and the low recognition result accuracy present in the existing image recognition are solved. Further, relevant persons can perform correct processing in time based on the recognition results, so as to satisfy the application requirements.

Optionally, the image recognition method provided by the embodiments of the present disclosure may be applied to the image recognition system shown in FIG. 1. As shown in FIG. 1, for example, whether a line of sight of a driver is normal is determined by image recognition, and the image recognition system architecture may include a processing apparatus 11 and a plurality of obtaining units. The plurality of obtaining units may, for example, include a first obtaining unit 12 and a second obtaining unit 13. The first obtaining unit 12 may be disposed in a first vehicle and the second obtaining unit 13 may be disposed in a second vehicle. The first obtaining unit 12 obtains data of a driver in the first vehicle, for example, face images of the driver. Similarly, the second obtaining unit 13 obtains data of a driver in the second vehicle. Illustratively, the first obtaining unit 12 and the second obtaining unit 13 may be cameras.

It can be understood that, the structures illustrated in the embodiments of the present disclosure do not constitute any limitation to the image recognition architecture. In some other feasible implementations of the present disclosure, the above architecture may include more or less components than illustrated, or combination of some components or separation of some components or different component arrangements, which can be determined based on actual application scenarios and thus not limited herein. The components shown in FIG. 1 can be implemented by hardware, software or combination of both.

In a specific implementation process, the above first obtaining unit 12 may obtain the face images of the driver in the first vehicle after the driver enters the vehicle and starts driving, and send the obtained images to the processing apparatus 11. Similarly, the above second obtaining unit 13 may obtain the face images of the driver in the second vehicle after the driver enters the vehicle and starts driving, and send the obtained images to the processing apparatus 11.

The processing apparatus 11, after receiving the face images of the driver from the first obtaining unit 12 and the second obtaining unit 13, determines a quality of these face images, and hence performs image recognition, i.e. face recognition, based on the quality of the images to determine whether the line of sight of the driver in the first vehicle and the second vehicle is normal. The recognition result accuracy is high and thus relevant persons can perform correct processing based on the recognition results.

Furthermore, the above architecture may also include a prompting unit, which can prompt the driver when the line of sight of the driver is determined as abnormal. The above prompting unit may be disposed in the vehicle. For example, when the above architecture includes two prompting units, one prompting unit may be disposed in each of the first vehicle and the second vehicle. The above processing apparatus 11 may determine a state of the driver in the first vehicle and the second vehicle based on the above face recognition results. If it is determined that the line of sight of the driver in the first vehicle is abnormal, prompt information may be sent to the prompting unit in the first vehicle. The prompting unit in the first vehicle may prompt the driver based on the above prompt information, for example, may play the voice of the above prompt information.

The above architecture may further include a displaying unit, which can be used to display the images of the driver and the recognition results and the like.

The displaying unit may also be a touch display screen which is used to receive an instruction of a user to interact with the user while displaying the above contents.

It should be understood that the above processing apparatus may be implemented by reading instructions in a memory through a processor and executing the instructions, or by a chip circuit.

The above system is only an illustrative system and may be set based on actual requirements during specific implementation.

It can be understood that the system architecture described in the embodiments of the present disclosure is used to more clearly describe the technical solution of the embodiments of the present disclosure rather than constitute any limitation to the technical solution of the embodiments of the present disclosure. Persons of ordinary skills in the arts know that the technical solution of the embodiments of the present disclosure is also applicable to similar technical problems along with evolution of the system architecture and appearance of new service scenarios.

The technical solution of the present disclosure will be described with several specific embodiments, with same or similar concepts or processes omitted in some embodiments.

Figure 2:
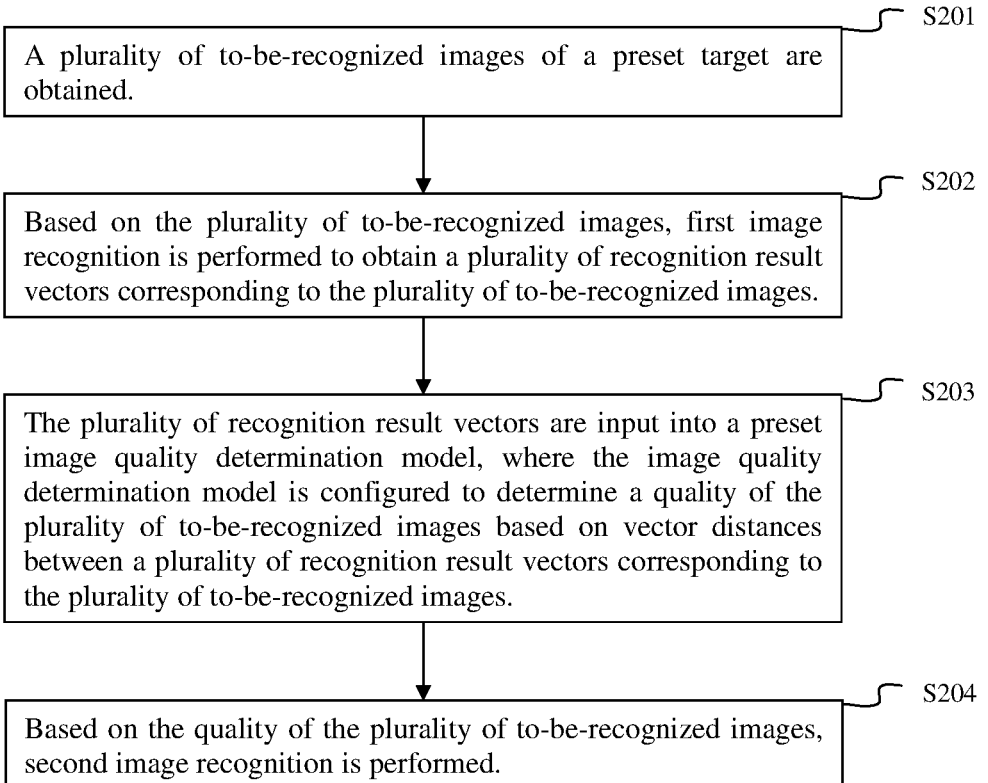
FIG. 2 is a flowchart illustrating an image recognition method according to an embodiment of the present disclosure.

FIG. 2 is a flowchart illustrating an image recognition method according to an embodiment of the present disclosure. The execution subject of the present embodiment may be the processing apparatus in FIG. 1. The specific execution subject may be determined based on actual application scenario, which will not be limited in the embodiments of the present disclosure. As shown in FIG. 2, the image recognition method provided by an embodiment of the present disclosure may include the following steps.

At step S201, a plurality of to-be-recognized images of a preset target are obtained.

The above preset target may be determined based on actual situations, for example, the above preset target may be the driver in the first vehicle as shown in FIG. 1.

The above processing apparatus may obtain a plurality of to-be-recognized images of the above preset target through an obtaining unit (e.g. camera). For example, the plurality of to-be-recognized images may be N to-be-recognized images, and the plurality of to-be-recognized images may be denoted as $I_1 \ldots I_N$.

At step S202, based on the plurality of to-be-recognized images, first image recognition is performed to obtain a plurality of recognition result vectors corresponding to the plurality of to-be-recognized images.

Illustratively, the above processing apparatus may the plurality of to-be-recognized images into a preset image recognition model, where the preset image recognition model outputs recognition result vectors based on input images, and hence, a plurality of recognition result vectors corresponding to the plurality of to-be-recognized images are obtained based on the output of the preset image recognition model.

The above processing apparatus may obtain an image recognition model used many times as the above preset image recognition model, for example, obtain an image recognition model with a number of use times greater than a preset threshold of times as the above preset image recognition model. Herein, the preset threshold of times may be determined based actual situations, for example, may be determined as 100.

The above processing apparatus may input the above images $I_1 \ldots I_N$ into the preset image recognition model to obtain a plurality of recognition result vectors corresponding to the images $I_1 \ldots I_N$, where the recognition result vectors may be denoted as $F_1 \ldots F_N$.

At step S203, the plurality of recognition result vectors are input into a preset image quality determination model, where the image quality determination model is configured to determine a quality of the plurality of to-be-recognized images based on vector distances between a plurality of recognition result vectors corresponding to the plurality of to-be-recognized images.

In the embodiments of the present disclosure, the above processing apparatus may obtain a plurality of reference images and perform first image recognition on the plurality of reference image to obtain a plurality of recognition result vectors corresponding to the plurality of reference images, and then determine a vector distance between each recognition result vector and each of the remaining recognition result vectors, for example, determine a vector distance between a recognition result vector $F_i$ and each of the remaining recognition result vectors. Further, there are a plurality of vector distances between the recognition result vector and each of the remaining recognition result vectors, and the above processing apparatus may calculate an average value of the plurality of vector distances, which is taken as the vector distance between the above recognition result vector $F_i$ and each of the remaining recognition result vectors, where the vector distance may be denoted as $D_i$.

Furthermore, the above processing apparatus may, based on the above vector distances, train an initial image quality determination model such that a value of a loss function of the trained initial image quality determination model satisfies a preset requirement, where the value of the loss function is determined based on a predicted quality of the plurality of reference images and a true quality of the plurality of reference images, and the predicted quality of the plurality of reference images is determined based on the vector distances. Thus, based on the trained initial image quality determination model, the above preset image quality determination model is obtained.

The above initial image quality determination model outputs the predicted quality of the plurality of reference images.

In addition, the above processing apparatus may obtain a minimum distance ($D_{min}=\min(D_1, D_2, \ldots, D_N)$) from the above vector distances $D_i$, and further determine whether the minimum distance is greater than a preset distance threshold. If the above minimum distance is less than or equal to the above preset distance threshold, the above processing apparatus may train the initial image quality determination model based on the above vector distances. If $D_{min}$ is greater than the above preset distance threshold, it indicates that there is no good image in the plurality of reference images, or there is an incorrect true value. Thus, the above images may be discarded without performing subsequent processing.

The above preset distance threshold may be determined based on actual situations, for example, based on a minimum value of the distances between the recognition result vectors corresponding to a plurality of good-quality images.

Illustratively, when training the initial image quality determination model based on the vector distances, the processing apparatus may obtain a minimum distance from the vector distances and calculate a first difference between a mean value of the distances and the vector distance $D_i$ corresponding to the above recognition result vector $F_i$, and a second difference between the mean value of the distances and the minimum distance $D_{min}$. Thus, based on the first difference and the second difference, the above initial image quality determination model is trained, where the predicted quality of the plurality of reference images is determined based on the first difference and the second difference.

For example, the above processing apparatus may use the following expression:

$$Q_i = \max\left(\frac{\bar{D} - D_i}{\bar{D} - D_{min}}, 0\right)$$

to determine the predicted quality $Q_i$ of the plurality of reference images, where $\bar{D}$ refers to a mean value of the distances of pre-stored negative samples. The mean value of the distances of the negative samples may be determined by obtaining distances between recognition result vectors corresponding to a plurality of negative samples. The negative samples may be understood as follows: for example, when the preset target is the driver in the first vehicle as shown in FIG. 1, the positive samples are the images of the driver (face images) and the negative samples are not the images of the driver.

At step S204, based on the quality of the plurality of to-be-recognized images, second image recognition is performed.

After determining the quality of the plurality of to-be-recognized images, the above processing apparatus may, based on the quality of the plurality of to-be-recognized images and a preset quality requirement, obtain target images from the plurality of to-be-recognized images, and based on the target images, perform second image recognition, thereby improving the accuracy of the image recognition results.

The preset quality requirement may be determined based on actual situations, for example, the quality of the plurality of to-be-recognized images is denoted as $Q_i$, and the above preset quality requirement may be denoted as Q'. The above processing apparatus may obtain images with $Q_i$ greater than Q' from the plurality of to-be-recognized images as the above target images, and then based on the target images, perform second image recognition, for example, input the target images into the above preset image recognition model and obtain a plurality of recognition result vectors corresponding to the above target images based on the output of the above preset image recognition model.

In the embodiments of the present disclosure, after a plurality of to-be-recognized images of a preset target are obtained, first image recognition is performed on the plurality of to-be-recognized images to obtain a plurality of recognition result vectors, and further, the plurality of recognition result vectors are input into a preset image quality determination model, where the image quality determination model is configured to determine a quality of the plurality of to-be-recognized images based on vector distances between a plurality of recognition result vectors corresponding to the plurality of to-be-recognized images. Next, based on the quality, second image recognition is performed. In this way, the quality of the to-be-recognized images is considered during image recognition, which solves the problems of missing detections and low recognition result accuracy in the existing image recognition. Further, in the embodiments of the present disclosure, since the image recognition accuracy is improved, relevant persons can perform correct processing in time based on the recognition results. Hence, the actual application requirements can be satisfied.

In addition, before second image recognition is performed based on the quality of the plurality of to-be-recognized images, in order to ensure the accuracy of the determined quality of the plurality of to-be-recognized images, the above processing apparatus also considers performing assessment on image quality determination based on the quality of the plurality of to-be-recognized images, and performs subsequent operations when the assessment is passed. In this way, the accuracy of the image recognition results can be improved further. FIG. 3 is a flowchart illustrating another image recognition method according to an embodiment of the present disclosure. As shown in FIG. 3, the method includes the following steps.

At step S301, a plurality of to-be-recognized images of a preset target are obtained.

At step S302, based on the plurality of to-be-recognized images, first image recognition is performed to obtain a plurality of recognition result vectors corresponding to the plurality of to-be-recognized images.

At step S303, the plurality of recognition result vectors are input into a preset image quality determination model, where the image quality determination model is configured to determine a quality of the plurality of to-be-recognized images based on vector distances between a plurality of recognition result vectors corresponding to the plurality of to-be-recognized images.

The steps S301 to S303 can be performed in the same manner as the steps S201 to S203 and thus will not be repeated herein.

At step S304, based on the quality of the plurality of to-be-recognized images, assessment on image quality determination is performed.

Illustratively, the above processing apparatus may, based on the quality of the plurality of to-be-recognized images, determine to-be-filtered images in the plurality of to-be-recognized images, and further, based on positive sample images in the plurality of to-be-recognized images, determine a before-filtering positive sample ratio, and based on the to-be-filtered images, determine a filtering ratio, and thus, based on the before-filtering positive sample ratio, determine a change curve of an after-filtering positive sample ratio and the filtering ratio, and then based on the change curve, perform assessment on image quality determination.

When determining the to-be-filtered images in the plurality of to-be-recognized images, the above processing apparatus may firstly determine those images not satisfying the above preset quality requirement in the plurality of to-be-recognized images, for example, those images with $Q_i$ less than or equal to Q', and further based on those images with $Q_i$ less than or equal to Q', obtain the to-be-filtered images in the plurality of to-be-recognized images.

Herein, when the above processing apparatus performs assessment on image quality determination, the filtering of the low-quality images may lead to change of the negative sample ratio. Thus, during an assessment, change of the before-filtering positive sample ratio and the after-filtering positive sample ratio is determined based on the illustrated positive and negative sample determination threshold. For example, the above processing apparatus may, based on the following expression, $$t_0 = \frac{tp}{Rp}$$

determine the before-filtering positive sample ratio $t_0$, where tp refers to a number of positive sample images in the plurality of to-be-recognized images, and Rp refers to a number of all sample images in the plurality of to-be-recognized images.

Furthermore, the above processing apparatus may, based on the following expression, $$r = \frac{F_{i-FN}}{Rp}$$

determine the filtering ratio r, where $F_{i-FN}$ refers to a number of the above to-be-filtered images.

The above processing apparatus may, based on the following expression, $$y = \min\left(\frac{tp}{Rp - F_{i-FN}}, 1\right) = \min\left(\frac{t_0}{1 - r}, 1\right)$$

determine the change curve y of the after-filtering positive sample ratio and the filtering ratio.

Therefore, the above processing apparatus may perform assessment on image quality determination based on the curve y.

From the above curve, it can be found that y increases along with increase of the filtering ratio r, and the actual situation is not very ideal. As a result, when performing assessment on image quality determination based on the curve y, the processing apparatus considers an ideal change curve of the after-filtering positive sample ratio and the filtering ratio and an actually-determined change curve of the after-filtering positive sample ratio and the filtering ratio and based on the two curves, determines an assessment index value, so as to complete the assessment on image quality determination.

Illustratively, the processing apparatus may obtain a pre-stored change curve of the after-filtering positive sample ratio and the filtering ratio (the ideal change curve of the after-filtering positive sample ratio and the filtering ratio) and further, based on the above change curve of the after-filtering positive sample ratio and the filtering ratio (the actually-determined change curve of the after-filtering positive sample ratio and the filtering ratio) and the pre-stored change curve of the after-filtering positive sample ratio and the filtering ratio, determine an assessment index value, and then based on the assessment index value, perform assessment on image quality determination.

Figure 4:
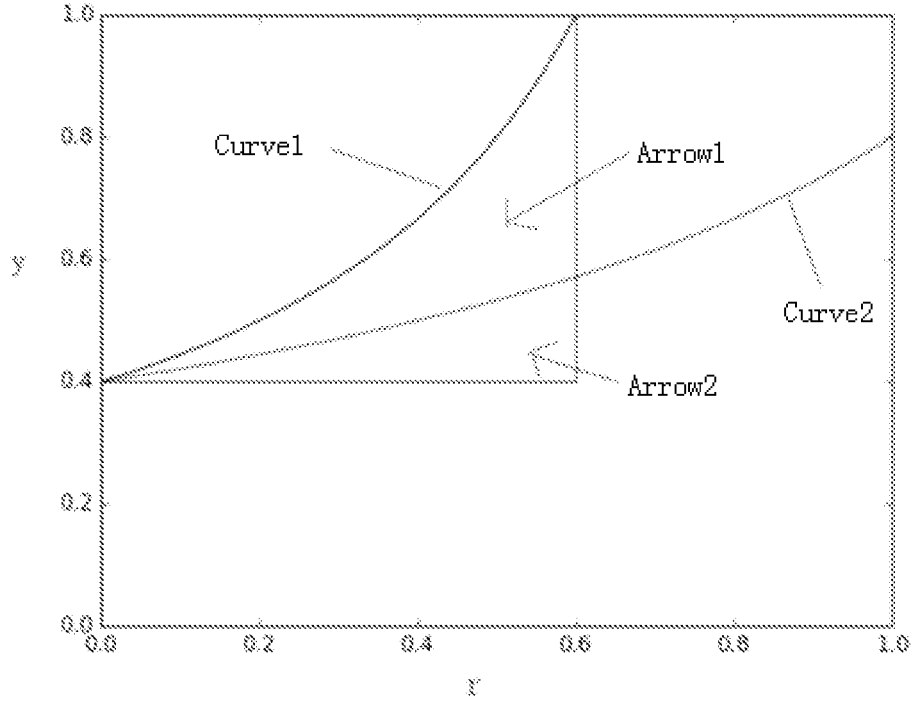
FIG. 4 is a schematic diagram illustrating a change curve of an after-filtering positive sample ratio and a filtering ratio according to an embodiment of the present disclosure.

For example, as shown in FIG. 4, the before-filtering positive sample ratio $t_0$ is 0.4, and the curve 1 is the pre-stored change curve of the after-filtering positive sample ratio and the filtering ratio (the ideal change curve of the after-filtering positive sample ratio and the filtering ratio):

$$y = \frac{0.4}{1-r}$$

The curve 2 is the above change curve of the after-filtering positive sample ratio and the filtering ratio (the actually-determined change curve of the after-filtering positive sample ratio and the filtering ratio):

$$y = \frac{t_0}{1-r}$$

Thus, the processing apparatus may determine an assessment index value, based on the two curves. If the assessment index value is greater than a preset assessment threshold, the processing apparatus determines the assessment is passed. For example, under $y=t_0$, at the right of r=0 and at the left of $r=1-t_0$, the processing apparatus may obtain a test index (area under the curve, AUC)$\in$ [0,1], with the area under the curve 1 as denominator and the area under the curve 2 as numerator. FIG. 4 shows two boundaries of r=0.6 and y=0.4. The area under the curve 1 is as indicated by the arrow 1 and the area under the curve 2 is as indicated by the arrow 2.

The preset assessment threshold may be set based on actual situations, for example, set to 0.8. When the above assessment index value is greater than the preset assessment threshold, the processing apparatus determines the assessment is passed, namely, assesses the above image quality determination is valid, and may further perform second image recognition based on the quality of the plurality of to-be-recognized images, so as to improve the accuracy of the image recognition.

At step S305, if the assessment is passed, second image recognition is performed based on the quality of the plurality of to-be-recognized images.

The step S305 can be performed in the same manner as the step S204 and will not be repeated herein.

In the embodiments of the present disclosure, before second image recognition is performed based on the quality of the plurality of to-be-recognized images, in order to ensure the accuracy of the determined quality of the plurality of to-be-recognized images, the above processing apparatus also considers performing assessment on image quality determination based on the quality of the plurality of to-be-recognized images, and performs subsequent operations when the assessment is passed. In this way, the accuracy of the image recognition results can be improved further. In addition, since the processing apparatus increases the accuracy of the image recognition, relevant persons can perform correct processing in time based on the recognition results, so as to satisfy the actual application requirements.

Figure 5:
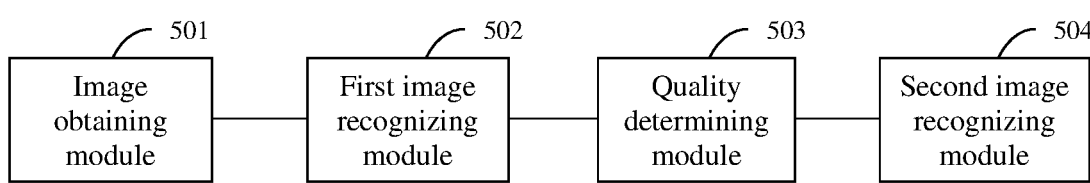
FIG. 5 is a structural schematic diagram illustrating an image recognition apparatus according to an embodiment of the present disclosure.

Corresponding to the image recognition method of the above embodiments, FIG. 5 shows a structural schematic diagram illustrating an image recognition apparatus according to an embodiment of the present disclosure. For ease of descriptions, only the part related to the present embodiment is shown. FIG. 5 is a structural schematic diagram illustrating an image recognition apparatus according to an embodiment of the present disclosure. The image recognition apparatus 50 includes an image obtaining module 501, a first image recognizing module 502, a quality determining module 503, and a second image recognizing module 504. The image recognition apparatus herein may be the above processing apparatus itself or a chip or integrated circuit having the function of the processing apparatus. It is herein to be noted that the image obtaining module, the first image recognizing module, the quality determining module and the second image recognizing module are divided based on logical function and may be physically integrated or separated.

The image obtaining module 501 is configured to obtain a plurality of to-be-recognized images of a preset target.

The first image recognizing module 502 is configured to, based on the plurality of to-be-recognized images, perform first image recognition to obtain a plurality of recognition result vectors corresponding to the plurality of to-be-recognized images.

The quality determining module 503 is configured to input the plurality of recognition result vectors into a preset image quality determination model, where the image quality determination model is configured to, based on vector distances between a plurality of recognition result vectors corresponding to the plurality of to-be-recognized images, determine a quality of the plurality of to-be-recognized images.

The second image recognizing module 504 is configured to perform second image recognition based on the quality of the plurality of to-be-recognized images.

In one possible implementation, the quality determining module 503 is further configured to:

obtain a plurality of reference images, and perform first image recognition on the plurality of reference images to obtain a plurality of recognition result vectors corresponding to the plurality of reference images;

determine a vector distance between a recognition result vector $F_i$ and each of the remaining recognition result vectors other than the recognition result vector $F_i$ in the plurality of recognition result vectors corresponding to the plurality of reference images, where the recognition result vector $F_i$ is any recognition result vector in the plurality of recognition result vectors corresponding to the plurality of reference images, i=1, . . . , N, and N is a number of vectors in the plurality of recognition result vectors corresponding to the plurality of reference images;

based on the vector distances, train an initial image quality determination model such that a value of a loss function of the trained initial image quality determination model satisfies a preset requirement, wherein the value of the loss function is determined based on a predicted quality of the plurality of reference images and a true quality of the plurality of reference images, and the predicted quality of the plurality of reference images is determined based on the vector distances;

based on the trained initial image quality determination model, obtain the preset image quality determination model.

In one possible implementation, the quality determining module 503 is further configured to:

obtain a minimum distances from the vector distances;

determine whether the minimum distance is greater than a preset distance threshold;

in response to that the minimum distance is less than or equal to the preset distance threshold, train the initial image quality determination model based on the vector distances.

In one possible implementation, the quality determining module 503 is specifically configured to:

obtain a minimum distance from the vector distances, and calculate a first difference between a mean value of the distances of pre-stored negative samples and a vector distance corresponding to the recognition result vector $F_i$, and a second difference between the mean value of the distances and the minimum distance;

based on the first difference and the second difference, train the initial image quality determination model, where the predicted quality of the plurality of reference images is determined based on the first difference and the second difference.

In one possible implementation, the second image recognizing module 504 is further configured to:

based on the quality of the plurality of to-be-recognized images, perform assessment on image quality determination;

if the assessment is passed, perform second image recognition based on the quality of the plurality of to-be-recognized images.

In one possible implementation, the second image recognizing module 504 is specifically configured to:

based on the quality of the plurality of to-be-recognized images, determine to-be-filtered images in the plurality of to-be-recognized images;

based on positive sample images in the plurality of to-be-recognized images, determine a before-filtering positive sample ratio, and based on the to-be-filtered images, determine a filtering ratio;

based on the before-filtering positive sample ratio, determine a change curve of an after-filtering positive sample ratio and the filtering ratio;

based on the change curve of the after-filtering positive sample ratio and the filtering ratio, perform assessment on image quality determination.

In one possible implementation, the second image recognizing module 504 is specifically configured to:

obtain a pre-stored change curve of the after-filtering positive sample ratio and the filtering ratio;

based on the change curve of the after-filtering positive sample ratio and the filtering ratio and the pre-stored change curve of the after-filtering positive sample ratio and the filtering ratio, determine an assessment index value;

if the assessment index value is greater than a preset assessment threshold, determine the assessment is passed.

In one possible implementation, the second image recognizing module 504 is specifically configured to:

based on the quality of the plurality of to-be-recognized images and a preset quality requirement, obtain target images from the plurality of to-be-recognized images;

based on the target images, perform second image recognition.

In one possible implementation, the first image recognizing module 502 is specifically configured to:

input the plurality of to-be-recognized images into a preset image recognition model, where the preset image recognition model outputs recognition result vectors based on input images;

based on the output of the preset image recognition model, obtain a plurality of recognition result vectors corresponding to the plurality of to-be-recognized images.

The apparatus provided by the embodiments of the present disclosure is used to perform the technical solution of the above method embodiments and its implementation principle and technical effects are similar to the method and will not be repeated herein.

Figure 6:
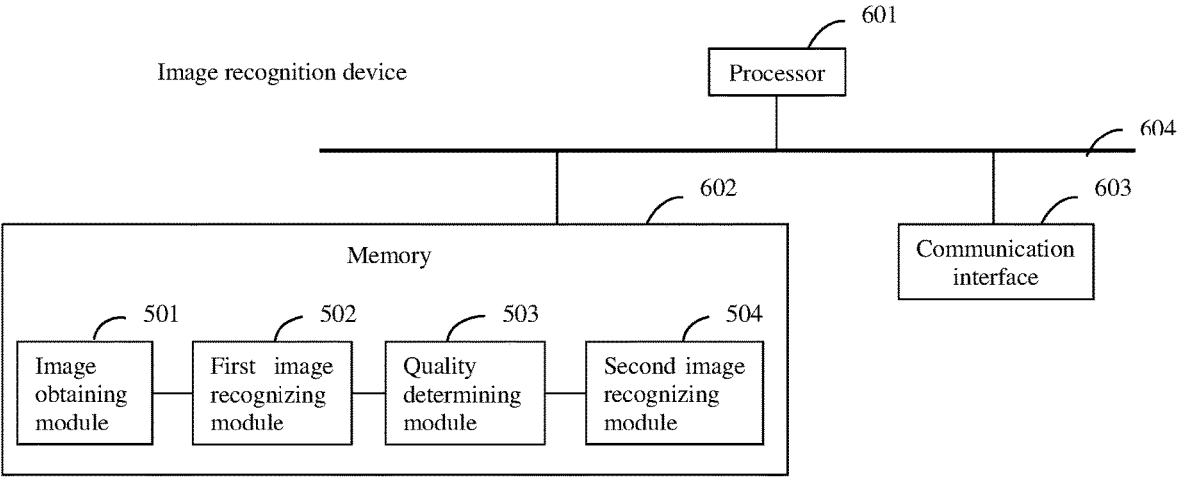
FIG. 6 is a schematic diagram illustrating a basic hardware architecture of an image recognition device according to an embodiment of the present disclosure.

Optionally, FIG. 6 is a schematic diagram illustrating one possible basic hardware architecture of an image recognition device according to an embodiment of the present disclosure.

As shown in FIG. 6, the image recognition device at least includes one processor 601 and a communication interface 603, and further, optionally, may include a memory 602 and a bus 604.

In the image recognition device, there may be one or more processors 601. FIG. 6 only shows one processor 601. Optionally, the processor 601 may be a central processing unit (CPU), a graphics processing unit (GPU), or a digital signal processor (DSP). The image recognition device may, for example, include a plurality of processors 601, which may be different or same in type. Optionally, the plurality of processors 601 of the image recognition device may be integrated as multi-core processor.

The memory 602 stores computer instructions and data; the memory 602 may store computer instructions and data required for implementing the image recognition method of the present disclosure. For example, the memory 602 may store instructions for performing the steps of implementing the above image recognition method. The memory 602 may be one or combination of several of the following storage media: non-volatile memory (for example, read only memory, ROM), solid state disk (SSD), hard disk drive (HDD), compact disk and volatile memory.

The communication interface 603 may provide information input/output for at least one processor and may also include one or combination of several of the following devices: network interface (for example, Ethernet interface), and wireless network card and other devices having network access function.

Optionally, the communication interface 603 may be used for the image recognition device to perform data communication with other computing devices or terminals.

Further, optionally, one thick line represents the bus 604 in FIG. 6. The bus 604 may connect the processor 601 with the memory 602 and the communication interface 603. In this case, the processor 601 may, through the bus 604, access the memory 602 and may also interact data with other computing devices or terminals through the communication interface 603.

In the present disclosure, the image recognition device executes the computer instructions in the memory 602 such that the image recognition device performs the image recognition method provided by the present disclosure or the image recognition device deploys the above image recognition apparatus.

From logical functional division, illustratively, as shown in FIG. 6, the memory 602 may include an image obtaining module 501, a first image recognizing module 502, a quality determining module 503 and a second image recognizing module 504. The "include" herein only involve that the instructions stored in the memory can be executed to respectively fulfill the functions of the image obtaining module, the first image recognizing module, the quality determining module and the second image recognizing module, without being limited by physical structure.

Furthermore, the above image recognition device, in addition to being implemented by software as shown in FIG. 6, may also be implemented as hardware module or circuit unit by hardware.

The present disclosure provides a computer readable storage medium, storing computer program product including computer instructions, where the computer instructions instructs a computing device to perform the above image recognition method provided by the present disclosure.

The present disclosure provides a computer program product including computer instructions, where the computer instructions are executed by a processor to perform the above image recognition method.

The present disclosure provides a chip including at least one processor and a communication interface, where the communication interface provides information input/output for at least one processor. Furthermore, the chip may also include at least one memory configured to store computer instructions. The at least one processor is configured to invoke and run the computer instructions to perform the above image recognition method provided by the present disclosure.

In the plural embodiments provided by the present disclosure, it should be understood that the disclosed apparatus and method may be implemented in another way. For example, the apparatus embodiments described herein are only illustrative, for example, the unit division is only a logical functional division and may be performed in another way during actual implementation. For example, multiple units or assemblies may be combined or integrated to another system or some features may be omitted or not implemented. On the other hand, the mutual coupling, or direct coupling or communication connection displayed or discussed may be performed through some interfaces and the indirect coupling or communication connection of the apparatuses or units may be in electrical or mechanical form or another form.

The units described as separate members may be or not be physically separated and the components displayed as units may be or not be physical units, namely, may be located in one place or distributed to a plurality of network units. Part or all units may be selected based on actual requirements to achieve the purpose of the solutions of the embodiments of the present disclosure.

Further, the functional units in the embodiments of the present disclosure may be integrated to one processing unit or present physically separately or two or more of the units are integrated to one unit. The integrated units may be implemented by hardware or in the form of hardware plus software functional units.

What is claimed is:

1. An image recognition method, comprising:
obtaining a plurality of to-be-recognized images of a preset target;
based on the plurality of to-be-recognized images, performing first image recognition to obtain a plurality of recognition result vectors corresponding to the plurality of to-be-recognized images;
inputting the plurality of recognition result vectors into a preset image quality determination model, wherein the image quality determination model is configured to determine a quality of the plurality of to-be-recognized images based on vector distances between the plurality of recognition result vectors corresponding to the plurality of to-be-recognized images;
based on the quality of the plurality of to-be-recognized images, performing second image recognition.

2. The method of claim 1, wherein before inputting the plurality of recognition result vectors into the preset image quality determination model, the method further comprises:
obtaining a plurality of reference images, and performing first image recognition on the plurality of reference images to obtain a plurality of recognition result vectors corresponding to the plurality of reference images;
determining a vector distance between a recognition result vector $F_i$ and each of the remaining recognition result vectors other than the recognition result vector $F_i$ in the plurality of recognition result vectors corresponding to the plurality of reference images, wherein the recognition result vector $F_i$ is any recognition result vector in the plurality of recognition result vectors corresponding to the plurality of reference images, $i=1, \ldots, N$, and N is a number of vectors in the plurality of recognition result vectors corresponding to the plurality of reference images;
based on the vector distances, training an initial image quality determination model such that a value of a loss function of the trained initial image quality determination model satisfies a preset requirement, wherein the value of the loss function is determined based on a predicted quality of the plurality of reference images and a true quality of the plurality of reference images, and the predicted quality of the plurality of reference images is determined based on the vector distances;
based on the trained initial image quality determination model, obtaining the preset image quality determination model.

3. The method of claim 2, wherein, before based on the vector distances, training the initial image quality determination model, the method further comprises:
obtaining a minimum distances from the vector distances;
determining whether the minimum distance is greater than a preset distance threshold;
based on the vector distances, training the initial image quality determination model comprises:
in response to that the minimum distance is less than or equal to the preset distance threshold, training the initial image quality determination model based on the vector distances.

4. The method of claim 2, wherein training the initial image quality determination model based on the vector distances comprises:

obtaining a minimum distance from the vector distances, and calculating a first difference between a mean value of the distances of pre-stored negative samples and a vector distance corresponding to the recognition result vector $F_i$, and a second difference between the mean value of the distances and the minimum distance;

based on the first difference and the second difference, training the initial image quality determination model, wherein the predicted quality of the plurality of reference images is determined based on the first difference and the second difference.

5. The method of claim 1, wherein before performing second image recognition based on the quality of the plurality of to-be-recognized images, the method further comprises:

based on the quality of the plurality of to-be-recognized images, performing assessment on image quality determination;

based on the quality of the plurality of to-be-recognized images, performing second image recognition comprises:

if the assessment is passed, performing second image recognition based on the quality of the plurality of to-be-recognized images.

6. The method of claim 5, wherein based on the quality of the plurality of to-be-recognized images, performing assessment on image quality determination comprises:

based on the quality of the plurality of to-be-recognized images, determining to-be-filtered images in the plurality of to-be-recognized images;

based on positive sample images in the plurality of to-be-recognized images, determining a before-filtering positive sample ratio, and based on the to-be-filtered images, determining a filtering ratio;

based on the before-filtering positive sample ratio, determining a change curve of an after-filtering positive sample ratio and the filtering ratio;

based on the change curve of the after-filtering positive sample ratio and the filtering ratio, performing assessment on image quality determination.

7. The method of claim 6, wherein based on the change curve of the after-filtering positive sample ratio and the filtering ratio, performing assessment on image quality determination comprises:

obtaining a pre-stored change curve of the after-filtering positive sample ratio and the filtering ratio;

based on the change curve of the after-filtering positive sample ratio and the filtering ratio and the pre-stored change curve of the after-filtering positive sample ratio and the filtering ratio, determining an assessment index value;

if the assessment index value is greater than a preset assessment threshold, determining the assessment is passed.

8. The method of claim 1, wherein based on the quality of the plurality of to-be-recognized images, performing second image recognition comprises:

based on the quality of the plurality of to-be-recognized images and a preset quality requirement, obtaining target images from the plurality of to-be-recognized images;

based on the target images, performing second image recognition.

9. An image recognition apparatus, comprising:

one or more processors, and a non-transitory storage medium in communication with the one or more processors, the non-transitory storage medium configured to store program instructions, wherein, when executed by the one or more processors, the instructions cause the apparatus to perform:

obtaining a plurality of to-be-recognized images of a preset target;

based on the plurality of to-be-recognized images, performing first image recognition to obtain a plurality of recognition result vectors corresponding to the plurality of to-be-recognized images;

inputting the plurality of recognition result vectors into a preset image quality determination model, wherein the image quality determination model is configured to determine a quality of the plurality of to-be-recognized images based on vector distances between the plurality of recognition result vectors corresponding to the plurality of to-be-recognized images;

based on the quality of the plurality of to-be-recognized images, performing second image recognition.

10. The image recognition apparatus of claim 9, wherein the inputting the plurality of recognition result vectors into a preset image quality determination model, wherein the image quality determination model is configured to determine a quality of the plurality of to-be-recognized images based on vector distances between the plurality of recognition result vectors corresponding to the plurality of to-be-recognized images is further configured to:

obtain a plurality of reference images, and perform first image recognition on the plurality of reference images to obtain a plurality of recognition result vectors corresponding to the plurality of reference images;

determine a vector distance between a recognition result vector $F_i$ and each of the remaining recognition result vectors other than the recognition result vector $F_i$ in the plurality of recognition result vectors corresponding to the plurality of reference images, wherein the recognition result vector $F_i$ is any recognition result vector in the plurality of recognition result vectors corresponding to the plurality of reference images, i=1, ..., N, and N is a number of vectors in the plurality of recognition result vectors corresponding to the plurality of reference images;

based on the vector distances, train an initial image quality determination model such that a value of a loss function of the trained initial image quality determination model satisfies a preset requirement, wherein the value of the loss function is determined based on a predicted quality of the plurality of reference images and a true quality of the plurality of reference images, and the predicted quality of the plurality of reference images is determined based on the vector distances;

based on the trained initial image quality determination model, obtain the preset image quality determination model.

11. The image recognition apparatus of claim 10, wherein the inputting the plurality of recognition result vectors into a preset image quality determination model, wherein the image quality determination model is configured to determine a quality of the plurality of to-be-recognized images based on vector distances between the plurality of recognition result vectors corresponding to the plurality of to-be-recognized images is further configured to:

obtain a minimum distances from the vector distances;

determine whether the minimum distance is greater than a preset distance threshold;

based on the vector distances, training the initial image quality determination model comprises:

in response to that the minimum distance is less than or equal to the preset distance threshold, training the initial image quality determination model based on the vector distances.

12. The image recognition apparatus of claim 10, wherein the inputting the plurality of recognition result vectors into a preset image quality determination model, wherein the image quality determination model is configured to determine a quality of the plurality of to-be-recognized images based on vector distances between the plurality of recognition result vectors corresponding to the plurality of to-be-recognized images is specifically configured to:

obtain a minimum distance from the vector distances, and calculate a first difference between a mean value of the distances of pre-stored negative samples and a vector distance corresponding to the recognition result vector $F_i$, and a second difference between the mean value of the distances and the minimum distance;

based on the first difference and the second difference, train the initial image quality determination model, wherein the predicted quality of the plurality of reference images is determined based on the first difference and the second difference.

13. The image recognition apparatus of claim 9, wherein the based on the quality of the plurality of to-be-recognized images, performing second image recognition is further configured to:

based on the quality of the plurality of to-be-recognized images, perform assessment on image quality determination;

based on the quality of the plurality of to-be-recognized images, performing second image recognition comprises:

if the assessment is passed, performing second image recognition based on the quality of the plurality of to-be-recognized images.

14. The image recognition apparatus of claim 13, wherein the based on the quality of the plurality of to-be-recognized images, performing second image recognition is specifically configured to:

based on the quality of the plurality of to-be-recognized images, determine to-be-filtered images in the plurality of to-be-recognized images;

based on positive sample images in the plurality of to-be-recognized images, determine a before-filtering positive sample ratio, and based on the to-be-filtered images, determining a filtering ratio;

based on the before-filtering positive sample ratio, determine a change curve of an after-filtering positive sample ratio and the filtering ratio;

based on the change curve of the after-filtering positive sample ratio and the filtering ratio, perform assessment on image quality determination.

15. The image recognition apparatus of claim 14, wherein the based on the quality of the plurality of to-be-recognized images, performing second image recognition is specifically configured to:

obtain a pre-stored change curve of the after-filtering positive sample ratio and the filtering ratio;

based on the change curve of the after-filtering positive sample ratio and the filtering ratio and the pre-stored change curve of the after-filtering positive sample ratio and the filtering ratio, determine an assessment index value;

if the assessment index value is greater than a preset assessment threshold, determine the assessment is passed.

16. The image recognition apparatus of claim 9, wherein the based on the quality of the plurality of to-be-recognized images, performing second image recognition is specifically configured to:

based on the quality of the plurality of to-be-recognized images and a preset quality requirement, obtain target images from the plurality of to-be-recognized images;

based on the target images, perform second image recognition.

17. An image recognition device, comprising:

a processor;

a memory; and a computer program;

wherein the computer program is stored in the memory and configured for being executed by the processor, and the computer program comprises instructions for performing the method of claim 1.

18. A non-transitory computer readable storage medium, storing instructions thereon, wherein the instructions are run on a computer to enable the computer to perform the method of claim 1.

19. A computer program product, wherein the computer program product is run on a computer to enable the computer to perform the method of claim 1.

* * * * *